Nov. 13, 1962  S. R. YOUNG  3,063,670

MODULAR FLEXURE SUPPORTS

Filed June 1, 1959

INVENTOR
SHIRREL R. YOUNG

BY *Elliott & Pastoriza*
ATTORNEYS

_United States Patent Office_

3,063,670
Patented Nov. 13, 1962

3,063,670
MODULAR FLEXURE SUPPORTS
Shirrel R. Young, Pico Rivera, Calif., assignor to Aeroscience, Inc., a corporation of California
Filed June 1, 1959, Ser. No. 817,367
9 Claims. (Cl. 248—358)

This invention relates generally to mounting structures and more particularly to novel modular flexure supports.

There are many instances which require flexible type support structures. For example, in rocket engine thrust tests, it is common practice to support the engine by flexible support means and observe its degree of movement under different thrust loads. To provide thrust mis-alignment information, such flexible support means must be capable of omni-directional or universal movement. Moreover, any energy absorbed in the support members themselves must be known to enable accurate computations to be made of the thrust forces under consideration.

In mechanical balances and force multiplying units, flexible type support members find further application. For example, a flexure support may serve as a substitute for a knife edge. By carefully compensating for restoring elastic forces in the main flexure member, an essentially "zero-force" spring results. In the case of force multiplying structures flexible connecting supports may serve as substitutes for pivots in the lever system thereby avoiding lost motion such as back-lash and the like.

In most flexure support applications, it is important that the flexure member itself be extremely accurate, of high strength, and yet sufficiently flexible to accommodate the desired motion. In addition, such member should be relatively insensitive to torsion and shear forces. Usually, presently available flexible support members are designed for the particular job under consideration and thus can constitute a considerable expense in a testing program. Further, in the event of slight mis-alignments, shims or equivalent spacers are often required to vary linear distances between various flexible members.

Bearing the foregoing in mind, it is a primary object of the present invention to provide a novel flexible type support or mounting in the form of a flexure unit which is completely integral and thus is capable of exhibiting a high degree of accuracy as compared to flexure members made up of separate components secured together.

Another important object is to provide an integral flexure unit which is extremely compact in physical size, of high strength, and yet relatively flexible in the plane in which flexure forces exist.

Another object is to provide a flexure unit of the foregoing type which is substantially insensitive to torsion and shear forces.

Still another important object is to provide the flexure unit in the form of a cube of symmetrical design to the end that provision of several such units provides a modular feature. In this connection, several units may be rigidly secured together and employed in parallel to accommodate larger loads and thereby avoid the necessity of manufacturing a particular flexure unit for the job at hand. Further, by rearranging the units flexure bending in any direction can be achieved.

Yet another object of the invention is to provide a combination flexure unit and micrometer permitting extremely accurate distances to be maintained between a supported load and stationary member without the use of shims, spacers, or equivalent elements.

Briefly, these and many other objects and advantages of the invention are attained by providing a flexure unit in the form of an integral block of metal having recessed areas defining lower and upper securing surfaces. These recessed areas further define a central flexure web extending between the lower and upper surface which web portion is the principal element of the block subject to the flexure forces.

In the preferred embodiment of the invention, the integral block is in the shape of a cube and the recessed areas define side webs extending normally to the plane of the central web adjacent opposite edges of the central web and interconnecting the upper and lower surfaces. These side webs will absorb any torsion or shear loads and thus prevent such torsion and shear loads from affecting the central web.

The lower and upper surfaces of the flexure unit are provided with openings for receiving suitable fastening means so that a number of the units may be secured together to enable the handling of larger loads or to effect universal flexure movement. Each of the units is also designed to co-operate in combination with a micrometer means to the end that the linear distance between two or more of the flexure units may be varied.

A better understanding of the preferred embodiments of the invention will be had by referring to the accompanying drawings in which.

Figure 1:
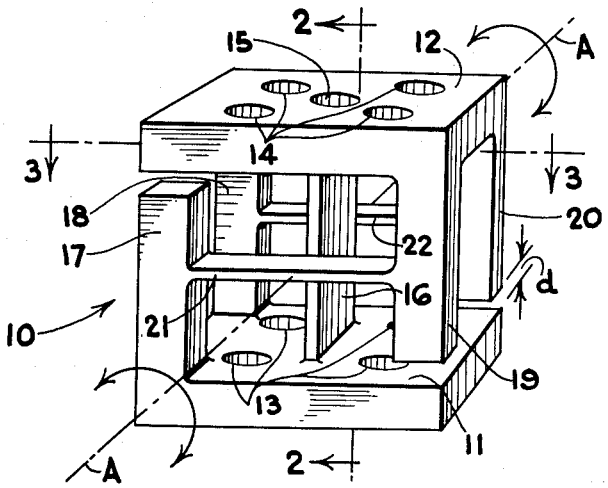
FIGURE 1 is an overall perspective view of the basic modular flexure unit of the invention.

Referring to FIGURE 1, the flexure unit is in the shape of an integral cube designated generally by the numeral 10. This cube includes recessed areas machined out to define a lower securing surface 11 and an upper securing surface 12. Surfaces 11 and 12 are respectively provided with a plurality of bore holes 13 and 14 for receiving suitable fastening means so that the lower and upper surfaces may be secured between a stationary base and a structure or other member to be supported. Each of the surfaces also includes a geometrically centered recess such as indicated at 15 for the upper surface 12. This center recess enables accurate alignment of the units in the event several are employed as in a modular system or in combination with micrometer screw means as will become clearer as the description proceeds.

As shown in FIGURE 1, interior portions of the block are recessed to define a central web 16 between the lower and upper securing surfaces 11 and 12. This web thus forms an integral continuation of the material of the upper and lower surfaces. Further recessing of the cube 10 is such as to provide the lower securing surface 11 with a free edge as indicated at the right in FIGURE 1, and upwardly extending legs 17 and 18 at the corners of the opposite edge to define an upright L-shape as viewed in FIGURE 1.

The upper securing surface is substantially parallel to the lower surface and includes an upper free edge disposed above the upwardly extending legs 17 and 18 to define first gaps as shown. The opposite edge of the upper securing surface includes downwardly extending legs 19 and 20 at the corners thereof terminating short of the free end of the lower securing surface 11 to define second gaps. The separation distance or gap dimension is indicated at "$d$" in FIGURE 1. It will thus be seen that the upper surface 12 and downwardly extending legs 19 and 20 define an inverted L-shape as viewed in FIGURE 1 which is symmetrical with respect to the lower securing surface and upwardly extending legs 17 and 18.

Finally, the recessing of the flexure block 10 is such as to define two side webs 21 and 22 integrally connected between the upwardly and downwardly extending legs respectively at substantially their midportions as shown. These side webs extend adjacent the central flat web 16 and are out of contact therewith. Essentially, the side webs 21 and 22 integrally connect the lower securing surface 11 to the upper securing surface 12 to absorb torsion and shear forces applied to these surfaces respectively. Because the side webs 21 and 22 extend substantially normally to the plane of the central web 16, however, they are not appreciably affected by flexure movements which forces are substantially wholly absorbed in the central web.

Figure 2:
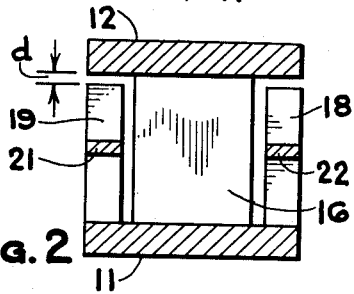
FIGURE 2 is a cross section taken in the direction of the arrows 2—2 of FIGURE 1.
Figure 3:
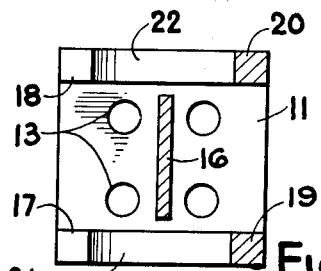
FIGURE 3 is another cross section taken in the direction of the arrows 3—3 of FIGURE 1.

The relationship of the central web and side webs can better be understood by referring to the cross sectional views illustrated in FIGURES 2 and 3. In these views, it will be noted that the longitudinal edges of the central web 16 are spaced inwardly to avoid any physical contact with the horizontal inner edges of the webs 21 and 22.

The first and second gaps defined between the ends of the upwardly and downwardly extending legs and the upper and lower securing surfaces respectively serve the dual functions of permitting flexure movement to take place between bodies secured to the lower and upper surfaces 11 and 12 respectively and yet limit such flexure movement to a value within the elastic limit of the central web 16. Thus, the respective ends of the upwardly and downwardly extending legs will seat on one or the other of the securing surfaces before flexure forces exceeding the elastic limit of the central web build up.

It will be evident from the foregoing description of the basic modular block shown in FIGURES 1, 2, and 3 that a relatively high degree of flexibility can be achieved and yet considerable strength maintained in a relatively compact structure. For example, the central web 16 is of a sufficient width that both compression and tension forces exerted normally to the securing surfaces can be readily accommodated by the web. The side webs in turn, and as mentioned heretofore, will withstand relatively large shear and torsion forces which may be applied to the opposite securing surfaces. These side webs also in view of their symmetrical location on either side of the central web and their normal disposition thereto will result in a flexing of the central web along its central medial line; that is, about the axis A—A shown in FIGURE 1 and as indicated by the circular arrows. As a consequence, the flexure stresses established in the central web are evenly distributed at the upper and lower ends of the web where it joins the upper and lower securing surfaces and the actual flexure bending itself occurs in its central portion.

Finally, as a consequence of the complete integral structure of the block in turn resulting from the formation thereof by recessing areas out of the block, extreme accuracy is insured in its operation. In other words, the upper and lower surfaces will always be restored to their substantially parallel initial positions upon cessation of flexing forces. Moreover, the proportionality between the flexure angle defined between the planes of the upper and lower surfaces and the restoring forces exerted by the central web is extremely linear. Another important feature of the integral structure is the complete elimination of any backlash in applications wherein the flexure unit is employed as a pivot or hinge coupling.

Figures 4, 5, 6:
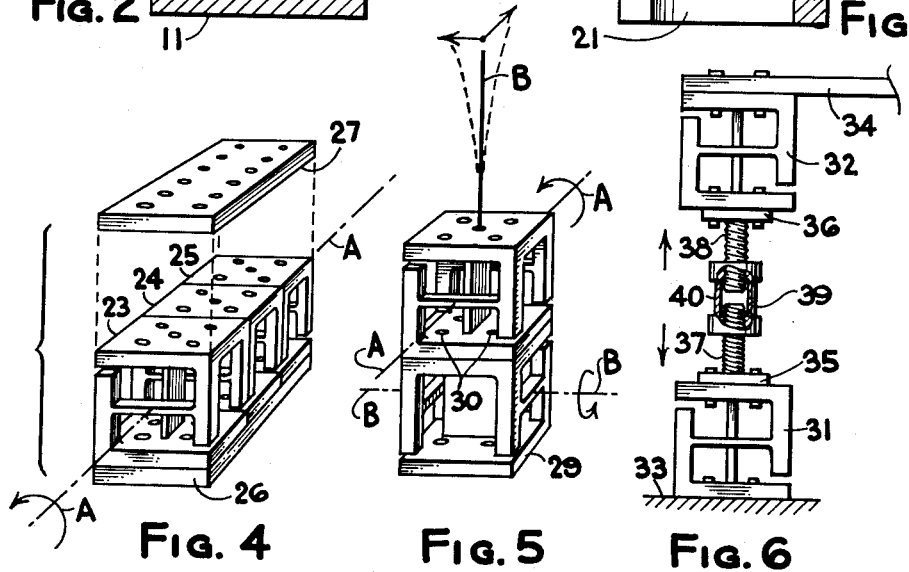
FIGURE 4 is a partially exploded perspective view illustrating one of the modular features of the invention.
FIGURE 5 is another perspective view of a universal type flexure member.
FIGURE 6 illustrates a combination of a pair of flexure units and micrometer means in accordance with the invention.

FIGURE 4 illustrates how several identical units similar to that illustrated in FIGURE 1 may be placed in side by side relationship with their central webs coplanar. In this arrangement, the three units designated 23, 24, and 25 may be rigidly secured in their side by side relationship by lower and upper tie plates 26 and 27 provided with suitable bore holes aligned with the bore holes in the lower and upper surfaces of the individual units themselves. With such an arrangement, it will be evident that the structural members in turn connected to the plates 26 and 27, respectively, and subjected to flexure forces will move all of the units simultaneously and thus this modular feature enables an overall structure to be built up which can accommodate relatively heavy loads. The primary advantage of this modular feature is that any overall flexure support of any desired strength may be provided without re-machining or constructing a particular flexure support for the job at hand.

FIGURE 5 illustrates another manner in which the flexure units may be assembled to provide universal flexure movement. In FIGURE 5 there is shown a pair of units 28 and 29 in which the lower securing surface of the member 28 is in face to face engagement with the upper securing surface of the member 29, these surfaces being bolted together by suitable bolts 30 passing through the various bore openings in the surfaces described in connection with FIGURE 1. By rotating one of the members such as the lower member ninety degrees with respect to the upper member prior to securing the members, the planes of the central webs are at right angles to each other. As a consequence, structural members secured to the opposite ends of the overall elongated flexure assemby can flex in all directions as indicated by the two arrows and dotted line orientation of the vertical axis B. Omni-directional movement of this type is desirable, for example, in supporting the nose portion of a rocket engine in which thrust mis-alignments are to be measured. By employing modular units of the type described, considerable tension and compression forces can be accommodated and yet the overall structure can be relatively flexible to omni-directional movements in the plane normal to the vertical axis B.

FIGURE 6 illustrates flexure units in combination with a micrometer screw means. As shown, there are provided upper and lower flexural blocks 31 and 32 each similar to the block 10 illustrated in FIGURE 1. The lower securing surface of the member 32 and the upper securing surface of the member 31 are shown secured respectively to a stationary base 33 and a supported member 34. Suitable flange members 35 and 36 are respectively secured to the upper securing surface of the block 31 and the lower securing surface of the block 32 and constitute terminations of micrometer screw members 37 and 38, respectively. The members 37 and 38 are, in turn, received within a socket body 39 provided with suitable receiving sockets in its opposite ends in axial alignment with the screws 37 and 38. The respective sockets and screws are of different thread pitch so that rotation of the micrometer socket body 39 will result in an overall change in the linear distance between the blocks 31 and 32. The body 39 may be provided with opposite flat surface portions 40 to facilitate turning of the same.

In the test of a rocket engine, for example, it is important that the axis of the engine be properly aligned. When the engine is to be supported by the flexure units described in the present invention, axial misalignment of one portion of the missile with the desired thrust direction employed as a reference can be overcome by varying the spacing between the solid support 33 and the member 34 which in the case under consideration would constitute a securing flange on the engine body proper. By employing similar combination block and micrometer means at other supporting points of the engine, proper axial alignment can be readily achieved without the use of shims or spacer blocks.

From the foregoing description, it will be evident that the present invention provides a greatly improved flexure type supporting member having a wide variety of applications. While only certain such applications and certain means of modular arrangement of the basic unit have been shown and described, it is to be understood that other combinations and arrangements that fall clearly within the scope and spirit of the present invention will readily occur to those skilled in the art. The modular flexure supports are, therefore, not to be thought of as limited to the particular embodiments described for illustrative purposes.

What is claimed is:

1. A flexure unit comprising: an integral block having recessed areas defining lower and upper securing surfaces and a central flexure web extending between said lower and upper surfaces, said recessed areas further defining side webs extending normally to the plane of said central web adjacent opposite edges thereof and interconnecting said lower and upper surfaces, said lower surface including upwardly extending corner legs the mid-portions of which connect respectively to first ends of said side webs and the upper portions of which terminate short of said upper surface to define first gaps, said upper surface including downwardly extending legs, the mid-portions of which connect respectively to the second ends of said side webs and the lower portions of which terminate short of said lower surface to define second gaps, whereby the degree of angular movement between said lower and upper surfaces is limited to the distance of said gaps.

2. A flexure unit comprising: an integral block having recessed areas defining a flat lower securing surface having a free end along one edge and upwardly extending legs at the corners of the opposite edge to define an upright L shape as viewed from the side; a flat upper securing surface substantially parallel to said lower surface and having a free end along that edge disposed above said upwardly extending legs to define a first gap therebetween and downwardly extending legs at the corners of the opposite edge to define an inverted L-shape when viewed from said side, said legs terminating short of said free end of said lower securing member to define a second gap therebetween; a flat central web connected between the central underside of said upper securing surface and the central top side of said lower securing surface; and side webs extending between central portions of said upwardly extending and downwardly extending legs respectively in directions normal to the plane of said central web, said first and second gaps limiting flexure movement of said central web to the distance of said gaps when the planes of said lower and upper securing surfaces are moved out of parallelism with each other.

3. The subject matter of claim 2, in which said side webs structurally inhibit torsional and shear forces applied to said lower and upper securing surfaces from affecting said central web and concentrate flexure forces applied to said surfaces to the central medial line of said central web substantially half way between said lower and upper securing surfaces.

4. The subject matter of claim 3, in which the four corners of said block define a cube, said lower and upper securing surfaces thereof having bores for receiving fastening means whereby several of said blocks may be disposed in side by side relationship with their central webs co-planar and secured in such position to enable simultaneous flexure movements of said webs.

5. The subject matter of claim 3, in which the four corners of said block define a cube, said lower and upper securing surfaces thereof having bores for receiving fastening means whereby two of said cubes may be secured together with the upper securing surfaces of one cube engaging in face to face contact the lower securing surface of the other cube, the planes of the central webs of said cubes being at right angles to each other whereby omni-directional flexure movement between the un-engaged faces of said cubes can taken place.

6. The subject matter of claim 3 in which the four corners of said block define a cube, said lower and upper securing surfaces having a plurality of bores for receiving fastening means and a centering recess geometrically positioned in the center of said surface; a micrometer member comprising a socket body having opposite threaded openings of different thread pitch; and micrometer screws of different pitch extending in opposite directions from said socket body and terminating in end flanges secured to the securing surfaces of two of said blocks respectively, whereby the linear distance between said blocks may be varied by rotating said socket body.

7. A flexure unit comprising: an integral block having flat opposite securing surfaces, said block including recessed areas defining a central web extending between said surfaces, the planes of said surfaces being parallel to each other and the plane of said central web being normal to said planes of said surfaces when said central web is in unflexed condition, said recessed areas further defining side webs extending normally to said plane of said central web adjacent opposite edges thereof and interconnecting said opposite surfaces.

8. The subject matter of claim 7, including an additional integral block identical to said first mentioned integral block and having one of its flat opposite securing surfaces secured to a securing surface of said first mentioned integral block so that its central web lies in a plane at right angles to the central web of said first mentioned integral block when in unflexed condition whereby omni-directional flexure movements of the remaining securing surface of said additional integral block with respect to the remaining securing surface of said first mentioned integral block can take place.

9. The subject matter of claim 7, including an additional integral block, identical to said first mentioned integral block; and micrometer screw means connected between opposing securing surfaces of said additional integral block and said first mentioned integral block whereby the linear distance between said additional integral block and said first mentioned integral block may be varied.

References Cited in the file of this patent

UNITED STATES PATENTS

| | | |
|---|---|---|
| 2,063,216 | Zaparka | Dec. 8, 1936 |
| 2,457,425 | Wolfard | Dec. 28, 1948 |
| 2,793,028 | Wheeler | May 21, 1957 |
| 2,960,302 | Brown | Nov. 15, 1960 |